Figure 1:
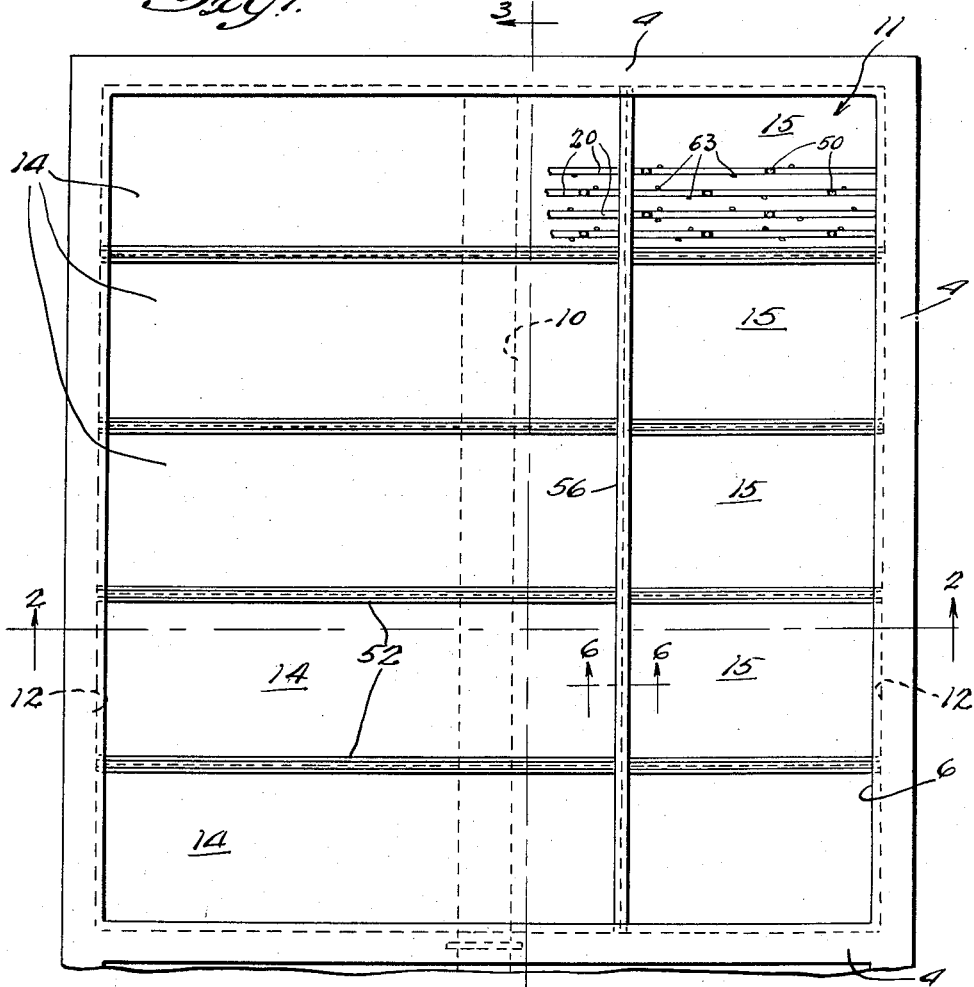

Feb. 17, 1959

J. L. SCHEID 2,873,857

FILTER UNDERDRAIN SYSTEM

Filed May 16, 1955

2 Sheets-Sheet 1

INVENTOR.
J. L. Scheid.
BY

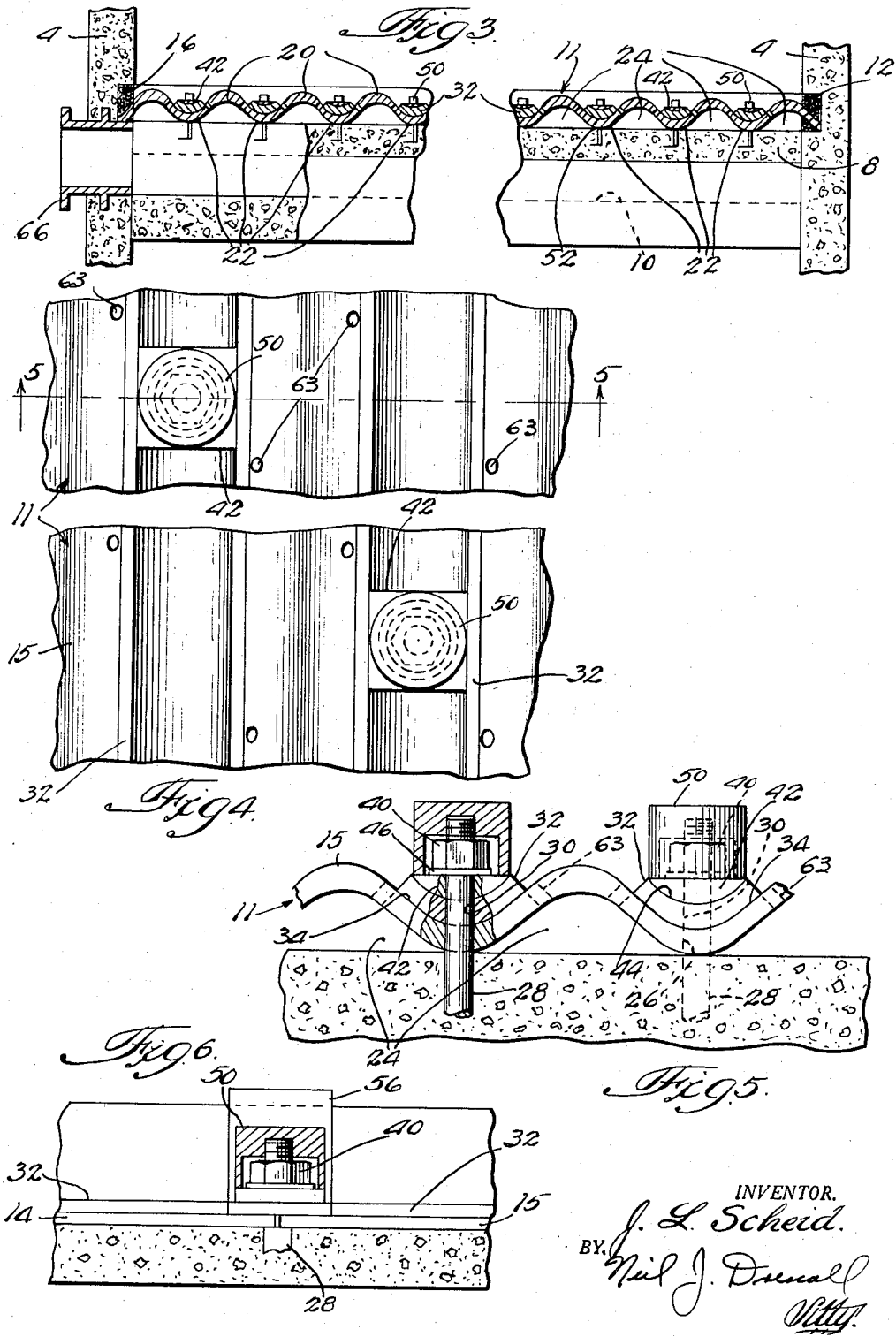

United States Patent Office 2,873,857
Patented Feb. 17, 1959

2,873,857

FILTER UNDERDRAIN SYSTEM

John L. Scheid, Maywood, N. J., assignor, by mesne assignments, to Union Tank Car Company, Chicago, Ill., a corporation of New Jersey Application May 16, 1955, Serial No. 508,554

5 Claims. (Cl. 210—293)

The invention relates to a filtering apparatus and particularly to a novel underdrain arrangement associated therewith.

It is well known in the art that the purpose of underdrain or false bottom arrangements is to induce a resistance to the downward flow of water during filtration and to the upward flow of water during filter backwashing whereby smooth liquid flow results with the delivery of nearly equal quantities of water to each element of area of the filter bed, thus obtaining equal velocity flow over the entire area of the filter. It is desirable to accomplish this with a minimum loss of head. These underdrain arrangements have been applied to virtually all types of filters used in the art, namely, those of concrete, wood and steel construction.

The underdrain arrangements utilized in the prior art filters have presented many difficulties, among them being complexity of installation with resulting high cost both from the standpoint of increased material consumption and increased labor required to make the installation. Additionally, the designs heretofore prevalent in the art required a rather large space between the underdrain and true bottom of the filters resulting in relatively large tank size and cost.

Furthermore, with the prior art arrangements, serious consideration had to be given to strengthening the underdrain to handle the loads normally incident to filter operation. The large space provided beneath the underdrain required numerous strengthening members to support the load during both the filtering and backwashing operations. In addition, in some filter applications, the problem of corrosion presented itself, particularly where the filter was of metallic construction and filtered an aggressive liquid, which attacked and dissolved or corroded the underdrain.

Accordingly, it is a general object of the present invention to provide a novel underdrain arrangement, which overcomes many disadvantages present in the prior art arrangements.

It is another object of the invention to provide a novel underdrain arrangement of simple design and easy assembly with savings both in material and labor in the completed filter and resulting in a structure more compact than other structures of similar capacity.

It is a further object of the invention to provide a novel underdrain arrangement that will provide improved flow control.

It is a particular object of the invention to provide an underdrain arrangement formed as an undulating or corrugated wall, having passages therein arranged to accommodate desired flow therethrough.

It is yet another specific object of the invention to provide an underdrain arrangement that eliminates the necessity for the numerous strengthening members present in the constructions heretofore used in the art.

It is a further specific object of the invention to provide an underdrain arrangement, as above described, wherein the passages formed therein have axes in non-parallel relation to each other.

Still another object of the invention is to provide a novel underdrain arrangement as above described and composed of a nonmetallic material, whereby corrosive effects of aggressive liquids are avoided.

Figure 2:
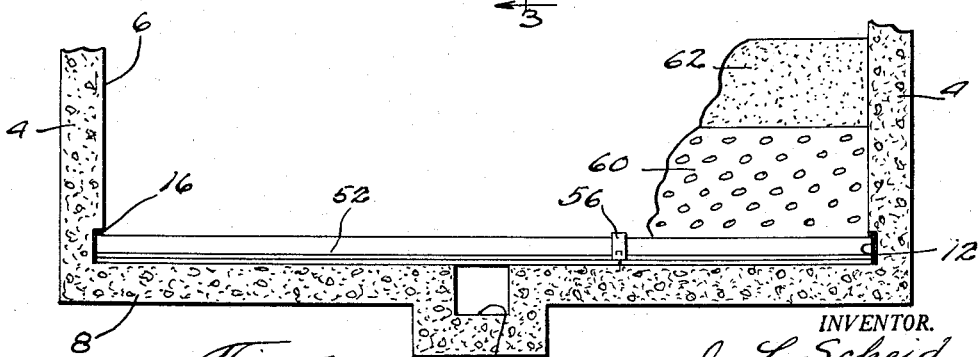

These and other objects of the invention will become apparent in the course of the following description and from an examination of the concerned drawings, wherein:

Figure 1 is a fragmentary, partially schematic, plan view of a filter employing the invention, Figure 2 is a sectional view taken along line 2—2 of Figure 1, Figure 3 is a fragmentary sectional view taken along line 3—3 of Figure 1, Figure 4 is a fragmentary enlarged plan view similar to Figure 1, illustrating a portion of the underdrain construction, Figure 5 is a fragmentary sectional view taken along line 5—5 of Figure 4, and Figure 6 is a fragmentary sectional view taken along line 6—6 of Figure 1.

The invention is illustrated as applied to a filter having walls 4, 4 of concrete construction and forming a rectangular tank 6, it being understood that the invention is also readily adaptable to filter constructions of wood or steel and that the herein disclosed embodiment is by way of illustration and not limitation.

The tank 6 is provided with a floor 8, which extends from and integrally joins the lower extremities of the vertical walls 4. A liquid passage or channel 10 may be provided in the floor 8 and preferably extends the length of tank 6 centrally thereof as illustrated in Figure 1. The vertical walls 4 may be peripherally indented as at 12 on the internal portion of the tank 6 immediately adjacent the line of juncture between the walls 4 and the floor 8.

The novel underdrain arrangement 11 may consist of a plurality of underdrain plates 14 and 15, horizontally disposed within the tank 6 and having certain ends thereof registered within the indentation 12 in the walls 4. To secure the plates 14 and 15 to the walls 4, the indentation 12 may be filled with grout 16 or similar mastic material. It will be understood that the invention is not limited to a particular number of plates 14 and 15, in that this arrangement is provided merely to accommodate easy installation of the underdrain 11 and that an installation could be provided wherein the underdrain 11 consisted of a single unitary plate or any number of plates, depending on the particular form of the filter under consideration.

Directing attention to Figures 3 through 5, it will be seen that the underdrain plate 11 is of non-planar formation and is preferably of undulating form having a plurality of generally parallel corrugations 20 formed therein. The corrugations 20 are preferably arranged to extend from left to right as seen in Figures 1 and 3 and are positioned in such a manner that the lower lands 22 of said corrugations abut the upper surface of the floor 8. In this manner the corrugations 20 define a plurality of passages 24 extending from left to right, as seen in Figure 1, of the tank 6, each of said passages 24 communicating with the channel 10 formed in the floor 8.

Directing attention to Figures 4 and 5, it will be seen that the low lands 22 of the plate 11 are provided with a plurality of holes 26, said holes being arranged to receive registering anchor bolts 28. The bolts 28 may be mounted on the plates and then imbedded in the floor 8 during initial filter construction. The bolts are arranged to extend upwardly through the openings 26 and through holes 30, which are provided in underdrain protectors 32. It will be noted that the underdrain protectors 32 are formed to abut the lower portions of upwardly facing channels 34 formed in the corrugated plates 14 and 15. The protectors 32 are longitudinally elongated to extend substantially the entire length of the channels 34 in the respective plates 14 and 15 and thus provide means for even pressure distribution and orifice protection as will hereinafter be more fully described.

Pressure distributing washers 42 arranged to conform to the arcuate surfaces 44 of the associated protectors 32 may be positioned over each bolt 28 intermediate a mounting nut 40. An additional washer 46 may also be provided. By tightening the bolts 40 the underdrain 11 and particularly the low lands 22 are brought into tight abutting engagement with the upper surface of the floor 8. Caps 50, preferably of nonmetallic material, may be provided to sleeve over the bolt nut assemblies 28, 40 and threadably engage the upper portion of the bolt and thus shield the bolt-nut assemblies 28, 40 from corrosive action of the filtered liquid.

As noted above, the underdrain 11 may be composed of a plurality of plates 14 and 15, said plates 14 and 15 having certain of their long edges in parallel abutting relationship as at 52 in Figures 1 and 3. As will be seen in Figure 3, the protector 32 in the particular channel formed by the abutting long edges of the plates 14 and 15 forms a seal for these edges. Additionally, the short abutting edges of the plates 14 and 15 may be sealed and held in place by a mounting strip 56 (Figures 1 and 6), said strip 56 being fixedly held in position by certain of the mentioned bolts 28.

As is well known in the art, the underdrain 11 supports a plurality of layered filtering beds, fragmentarily shown in Figure 2. For illustrative purposes the filtering beds are shown as a layer of gravel or rough aggregate filter 60 immediately adjacent the underdrain 11. Above the rough aggregate filter 60 a layer of finer aggregate filtering sand 62 may be provided.

In operation of the type of filter here under consideration, the water or other liquid is normally passed downwardly through the filtering beds 62 and 60 whereby it comes into contact with the underdrain 11. The underdrain 11 introduces a resistance to the downward flow of water during such filtration operation and aids in the induction of equal velocity flow over the entire filter area. This is particularly accomplished by the disposition of a plurality of small holes or apertures 63 which establish communication between the filter area above the underdrain 11 and the passages 24 formed beneath the underdrain 11. The apertures 63 are disposed in predetermined spaced relationship over the entire area of the underdrain 11, whereby escape of the liquid from the chamber 6 is accommodated across the entire horizontal cross section of the underdrain. The liquid is then carried via passages 24 to the passage 10 and from there to the outgoing port 66.

It will be noted that the protectors 32, in addition to strengthening the plate 11 particularly over the channel 10, serve to protect the adjacent orifices 63 which are formed in the plate. These orifices are located in the downward slope of the corrugations in close adjacency to the protector 32 and have axes in angular relation to the vertical. With this arrangement, pieces of the rough aggregate 60 are prevented from blocking the apertures 63 which would result in obstruction of liquid flow.

It will also be understood that a determined area relationship must be maintained between the channel 10, the passages 24 and the apertures 63 to insure susbtantially equal flow over the entire underdrain 11. However, this determined relation may vary with different installations and is not per se part of the herein disclosed invention, inasmuch as it is well within the purview of the skilled designer.

To backwash the filter, flow is reversed and relatively clean liquid is forced into the channel 10, through the passages 24 and from there through the apertures 63 and upwardly through the filtering beds. Again, the particular arrangement of passages 24 and apertures 63 over the entire area of the underdrain 11 provides for smooth velocity flow to the entire area of the filter bed.

Thus it will be seen that I have provided a novel filter underdrain which satisfies in an improved manner the primary requirement of structures of this type, that is, an even distribution of smooth flow throughout the entire filtering apparatus. Furthermore, it will be readily appreciated that the particular undulating or corrugated formation of the underdrain 11 is an inherently stronger structure than the underdrain forms heretofore utilized in the art. This, in addition to the increased support area of engagement with the surface of the floor 8, does away with the necessity of additional strengthening members found in the prior art arrangements. This arrangement is very advantageous when considering the reversing loads incident to filtering and backwashing.

In the filtration operation the underdrain must support the load provided by the overlying filtering beds, as well as the load induced by the circulating liquid. In the backwashing operation the rate of flow is materially increased as compared to the filtration operation, creating an extremely large back pressure, which impinges itself on the lower surface of the underdrain 11. In addition, the underdrain may be subjected, during the backwashing operation, to occasional shock loads due to liquid surge which momentarily tremendously increases the upward pressure on the underdrain. The particular formation of my novel underdrain is such that it will readily accommodate the downward loads incident to the filtration operation and also easily withstands the upward pressures found during the backwashing operation. The protectors 32 play a further significant part in the backwashing operation in that they act as additional strengtheners and serve to distribute the upward loads more evenly to the anchor bolts.

As an additional feature of the invention, I preferably construct the underdrain 11 of a non-ferrous material such as plastic or Transite, thus materially preventing the destructive effects of corrosion heretofore mentioned. However, in installations where corrosion is not a pressing problem, the underdrain may be constructed of ferrous or other metallic materials.

It will also be apparent that the herein disclosed arrangement greatly simplifies filter design and construction and especially eliminates complicated forming and coring heretofore necessary in building concrete filters. Furthermore, the arrangement considerably reduces filter size as compared to other arrangements of similar capacity.

It will be understood that the novel arrangement herein disclosed may be subject to many minor variations within the purview of one skilled in the art without departing from the spirit of the invention.

I claim:

1. In a filtering apparatus, a tank having vertical walls and a bottom floor joining the walls, said floor having at least one enlarged flat surface area thereon, a porous underdrain covering the floor, said underdrain comprising a continuous undulating member extending over the entire floor and having high and low portions thereon, said high portions defining with said flat area parallel passages extending across said floor, said low portions being in direct engagement with said area, channel means formed in the floor below said flat area and communicating with and extending transversely of said passages, and a plurality of securing means extending through said underdrain and directly connected to the floor to fixedly connect said low portions to said area.

2. A filtering apparatus according to claim 1, wherein said securing means comprises a plurality of nut-bolt arrangements, and elongated elements disposed in and coextensive with said low areas and secured to said nut-bolt arrangements.

3. A filtering apparatus according to claim 2, wherein said porous underdrain is connected to said vertical walls.

4. A filtering apparatus according to claim 2, wherein said low portions are in continuous linear engagement with said flat area.

5. In a filtering apparatus, a tank having vertical concrete unitary walls arranged in a rectangular pattern, a concrete bottom floor joining the vertical walls, said floor having two flat upper surfaces falling in a common plane, a channel centrally formed in said floor and intermediate said surfaces and extending therebelow, a porous underdrain covering the entire floor, said underdrain comprising a continuous corrugated member, said corrugations defining parallel passages with said surfaces extending entirely across said floor, said corrugations having low portions directly engaging said surfaces, said passages being arranged perpendicular to said channel to communicate therewith, and means to secure the low portions to the concrete floor, said means comprising a plurality of spaced nut and bolt arrangements extending through the underdrain and embedded in the concrete floor, and protector strips disposed in said corrugations and engaging said low portions on the side of the underdrain remote from said floor, said protector strips being securely fastened to said nut and bolt arrangements and in continuous abutting engagement with said low portions.

References Cited in the file of this patent

UNITED STATES PATENTS

| | | |
|---|---|---|
| 1,163,334 | Gammage | Dec. 7, 1915 |
| 2,528,062 | Lances | Oct. 31, 1950 |

FOREIGN PATENTS

| | | |
|---|---|---|
| 17,837 | Great Britain | 1905 |
| 613,805 | France | Mar. 31, 1926 |
| 133,580 | Australia | Aug. 4, 1949 |